Aug. 15, 1944.  M. K. PROKUL  2,356,087
COUNTERSINKER OR THE LIKE FOR NUTS
Filed March 23, 1943   3 Sheets-Sheet 1

INVENTOR
Michael K. Prokul
BY
Horace B Van Valkenburgh
ATTORNEY

Aug. 15, 1944.  M. K. PROKUL  2,356,087
COUNTERSINKER OR THE LIKE FOR NUTS
Filed March 23, 1943   3 Sheets-Sheet 2
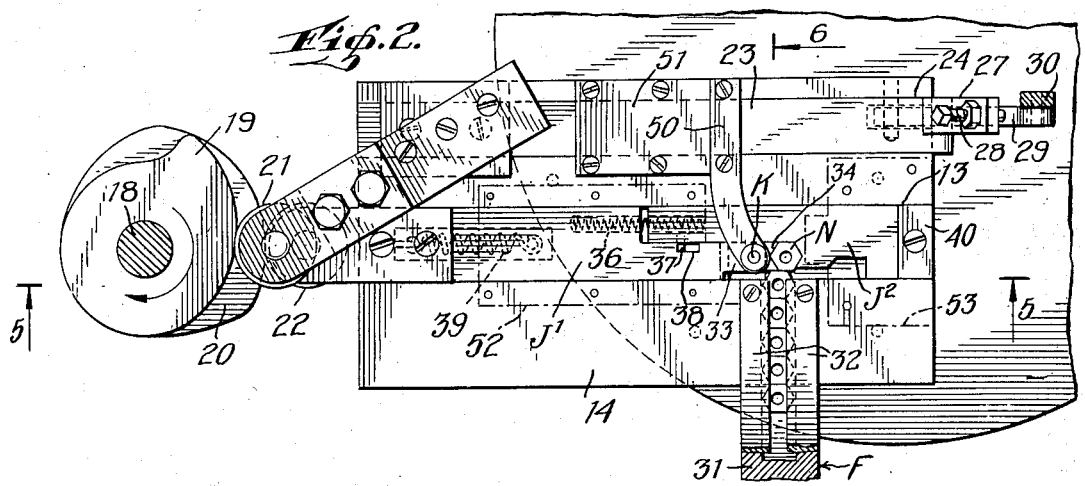
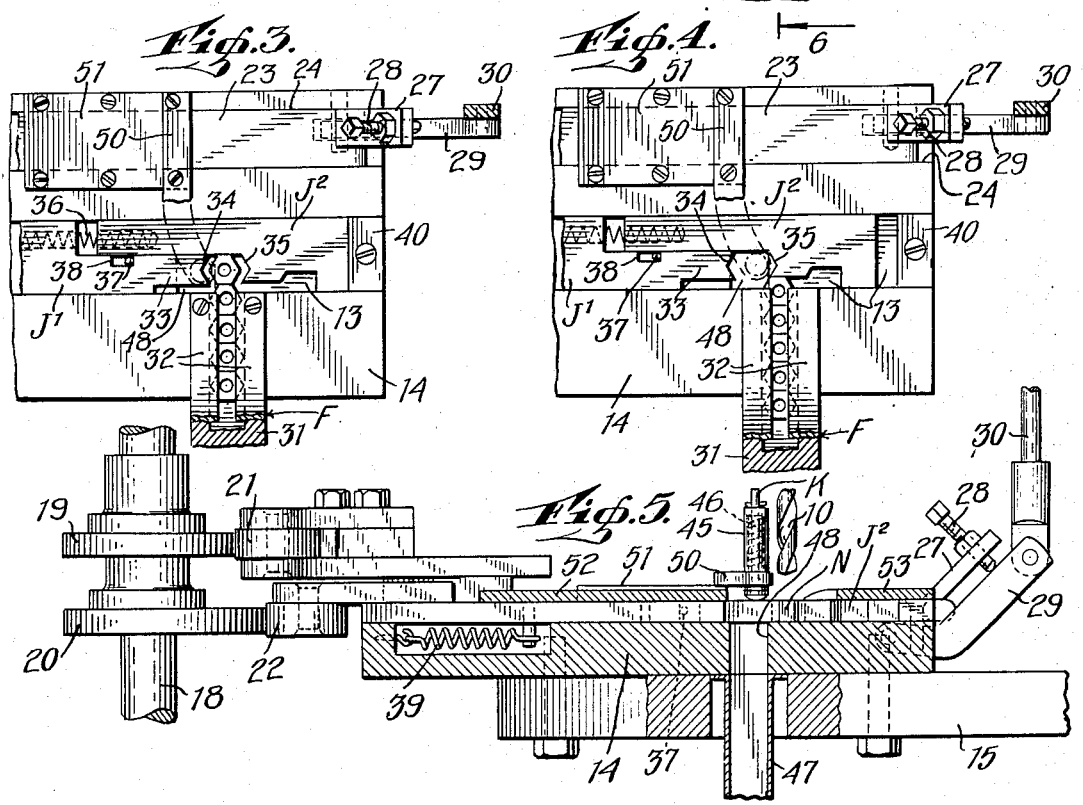
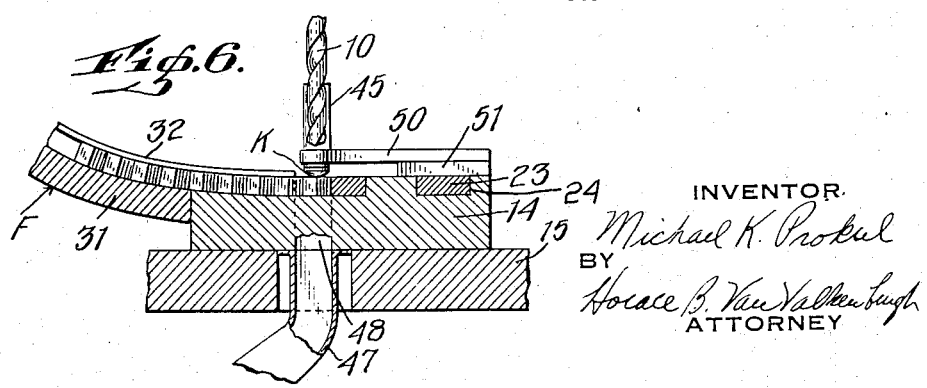
INVENTOR.
Michael K. Prokul
BY
Horace B. Van Valkenburgh
ATTORNEY Aug. 15, 1944.    M. K. PROKUL    2,356,087
COUNTERSINKER OR THE LIKE FOR NUTS
Filed March 23, 1943    3 Sheets-Sheet 3
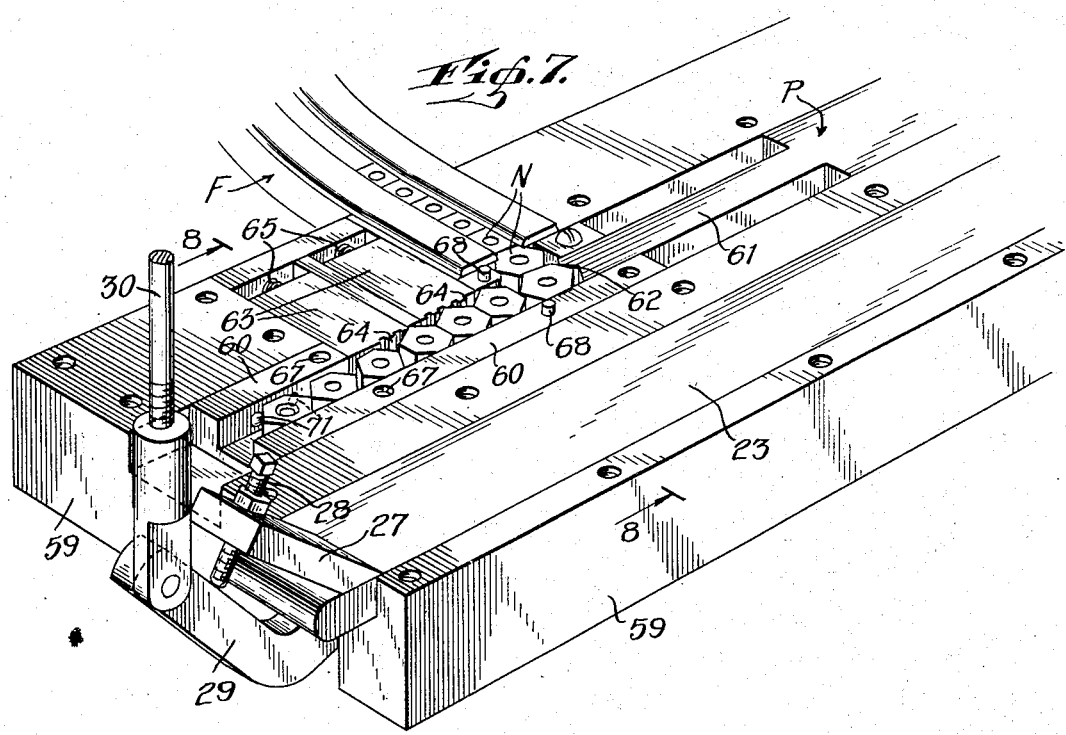
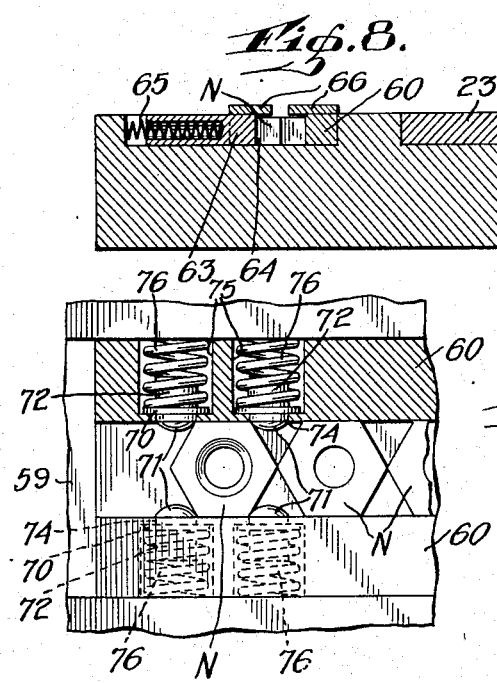
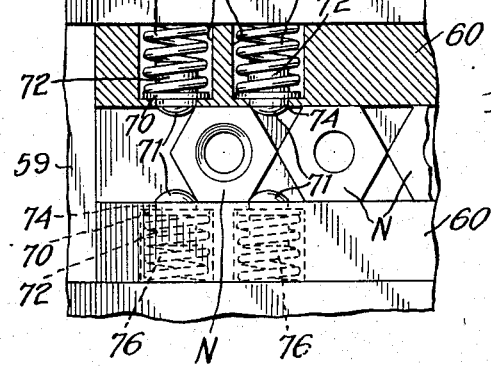
INVENTOR
Michael K. Prokul
BY
Horace B. Van Valkenburgh
ATTORNEY Patented Aug. 15, 1944

2,356,087

UNITED STATES PATENT OFFICE 2,356,087

COUNTERSINKER OR THE LIKE FOR NUTS

Michael K. Prokul, Maplewood, N. J., assignor to Elastic Stop Nut Corporation of America, a corporation of New Jersey Application March 23, 1943, Serial No. 480,167

5 Claims. (Cl. 10—75)

This invention relates to apparatus for performing a tool operation on a plurality of similar articles, such as a countersinker or tapper for nuts, and is of particular importance in connectio with asymmetrical articles, such as the type of nut disclosed in U. S. Patent No. 1,550,282. In this type of nut, a locking insert or washer, preferably formed of fiber or the like, is held at one end of the threads in a washer well, the sides of the well being crimped over onto the washer.

When a bolt or screw is threaded into such a nut, the bolt makes its own threads in the washer and, as generally recognized, the washer forces the load side of the bolt threads against the load side of the nut threads at all times, so that the friction between the load sides of the threads will prevent the nut and bolt from turning relative to each other, even during excessive vibration.

On the opposite end of the threads from the washer well, the nut is countersunk so that the bolt or screw may be started more readily. A symmetrical nut, such as the standard SAE or USS hex nut, is countersunk at both ends, and machines exist for simultaneously countersinking both ends of the bore of such symmetrical nuts. However, it is difficult to adapt such machines to operate efficiently and effectively in countersinking asymmetrical nuts, only one end of which is to be countersunk.

Among the objects of this invention are to provide an improved apparatus—such as a countersinker, tapper, or the like—for performing a tool operation on a plurality of similar articles; to provide such apparatus which will be substantially automatic in operation; to provide such apparatus in which the articles may be fed in succession to a predetermined position, and held securely in such position while the tool operation is being performed; to provide such apparatus in which the next article will automatically replace the preceding article after the operation has been performed; to provide such apparatus which is capable of being easily altered to perform other operations, merely by changing the tool; to provide apparatus for performing a rotary tool operation on a plurality of similar articles; and to provide apparatus of the foregoing character which is light in weight, relatively simple in construction, efficient in operation, and particularly adapted to perform a tool operation on a plurality of similar asymmetrical articles.

Other objects and novel features of this invention will become apparent from the following description and accompanying drawings, in which Fig. 1 is a perspective view illustrating one form of apparatus constructed in accordance with this invention, comprising a nut countersinker;

Fig. 2 is a plan view of an operating base or table unit of the apparatus of Fig. 1;

Fig. 3 is a plan view of a portion of the operating table, with the moving parts in a position different from that of Fig. 2;

Fig. 4 is a plan view of a portion of the operating table unit, similar to Fig. 3, but illustrating a still different position of the moving parts;

Fig. 5 is a vertical section taken through the table along line 5—5 of Fig. 2;

Fig. 6 is a cross-section of the table taken along line 6—6 of Fig. 2;

Fig. 7 is a perspective view of a section of the table of a modified form of apparatus, also constructed in accordance with this invention;

Fig. 8 is a cross-section of the table taken along line 8—8 of Fig. 7; and

Fig. 9 is a plan view on an enlarged scale and partly in section, of the end portion of the table of the apparatus of Fig. 7.

Figure 1:
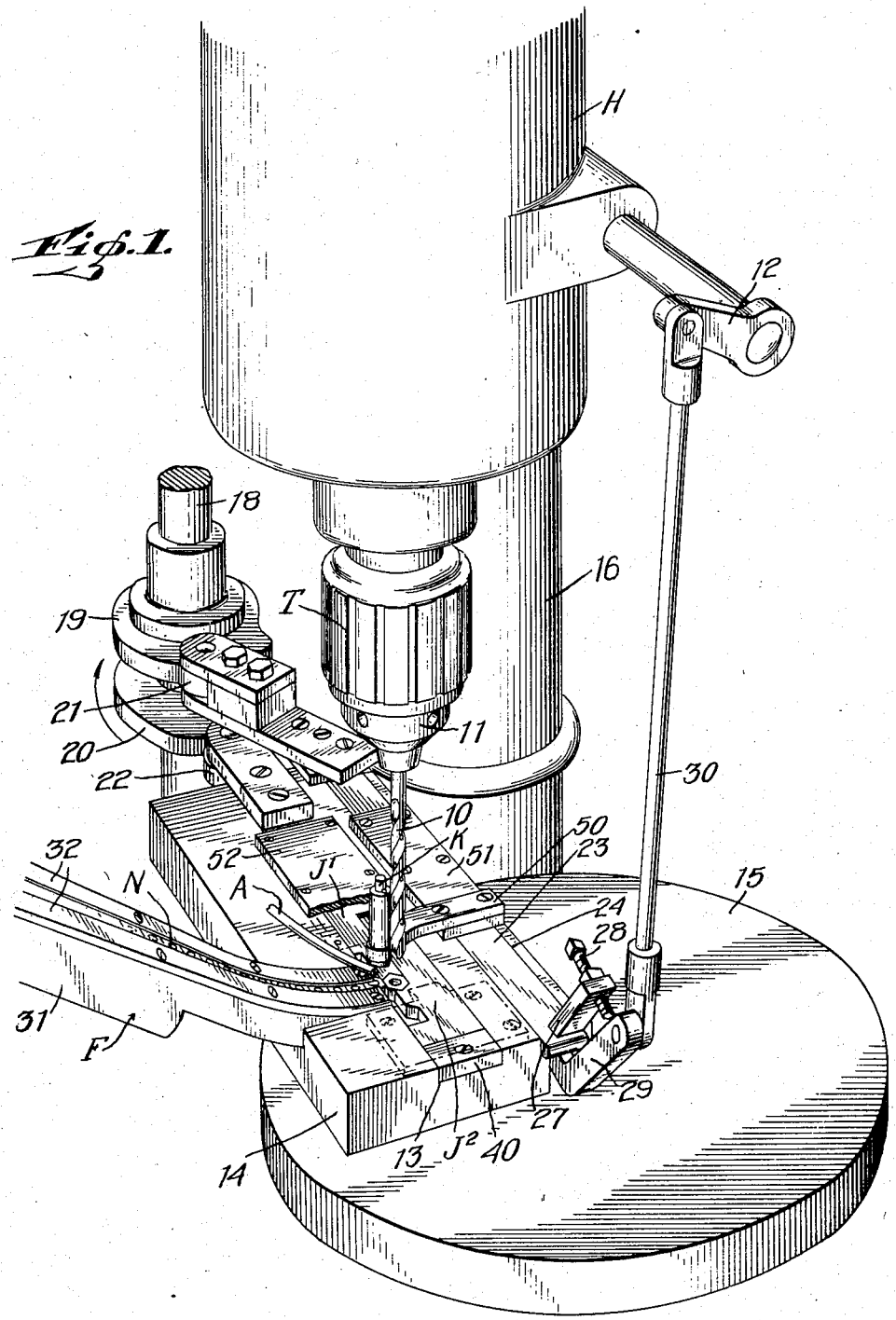

One form of apparatus constructed in accordance with this invention, comprising a nut countersinker as shown in Fig. 1, includes a feed chute F for leading nuts N to a pair of jaws $J_1$ and $J_2$. The jaws convey each nut, in turn, to a predetermined position at which an operation is to be performed thereon by a tool T. In the present instance, tool T includes a drill 10 mounted in a rotating chuck 11, which is reciprocal upwardly and downwardly in a head H by a lever 12. An air tube A, which in some instances may be found unnecessary, directs a jet of compressed air against the nut while it is being countersunk, to blow away chips that might lodge between and interfere with the operation of any of the moving parts. Jaws $J_1$ and $J_2$ hold the nut in the desired position during countersinking, then move the nut to a position beneath a knockout pin K and simultaneously move apart, so that the nut may drop into a chute to be carried to a bin or other suitable receptacle beneath the apparatus. Jaws $J_1$ and $J_2$ slide in a groove 13 formed in a block 14, which is mounted on a platform 15, in turn supported by a standard 16 on which head H is also mounted.

The apparatus also includes a cam shaft 18 provided with cams 19 and 20 for moving followers 21 and 22, respectively. Follower 21 is attached to a bar 23, which slides in a groove 24 formed in block 14 and which causes tool T to move upwardly and downwardly. A bracket 27, attached to the end of bar 23 opposite cam follower 21, carries an adjustable set screw 28 adapted to engage a lever 29 pivotally connected at its lower end to block 14 and at its upper end to a rod 30. Rod 30 is pivotally attached to the crank arm of lever 12. Forward movement of bar 23 rotates lever 12 in a counterclockwise direction, pulling chuck 11 down against spring pressure, exerted inside head H, while rearward movement of bar 23 permits the chuck to rise again.

As in Figs. 2 and 3, chute F includes a channel or trough 31 and a pair of cover plates 32, which leaves sufficient room therebetween for inserting a small tool or the like to move nuts upwardly or downwardly therein. The nuts may be supplied to chute F from a selective hopper or feed device, which insures that the nuts will be fed in orderly arrangement down the chute. The chute is placed at a sufficient angle to the horizontal so that the nuts will slide easily and be automatically fed by gravity—acting both through the weight of each nut and through the pressure of nuts further up the chute—to the jaws or other desired position.

As in Figs. 2-6, jaws $J_1$ and $J_2$ are complementary, jaw $J_1$ being provided with a tongue 33 having a 120° fork 34 and jaw $J_2$ with a cooperating 120° fork 35. As in Fig. 2, these forks and the side of jaw $J_2$ along which tongue 33 slides, form five of the six sides of a hexagon, thus holding a hexagonal nut firmly and securely. The lower end of the chute terminates at a point a slight distance laterally from the center line of drill 10, so that when the jaws are open and in position to receive the nut, the nut will clear the extending point of the fork of jaw $J_2$. The jaws tend to be held open by a compression spring 36, but can open only a predetermined limited amount, being restrained by a detent pin 37 attached to jaw $J_2$ and moving within the limits of a slot 38 in the side of jaw $J_1$. Jaw $J_1$ tends to be pulled to the left by a tension spring 39, while a stop 40 in jaw guide groove 13 limits movement of jaw $J_2$ to the right.

Assuming that cams 19 and 20 are in the position shown in Fig. 2, with the drill chuck descending during a counterboring operation, the nut will be held securely in position, since cam 20 will have forced follower 22 to the right and, with it, both jaws. With the cams rotating in the direction of the arrow of Fig. 2, and moving toward the Fig. 3 and then the Fig. 4 positions, as indicated on Fig. 2, the highest point of cam 19 will shortly pass the follower 21.

At this time, the nut will have been countersunk to a predetermined depth, determined by the highest point of cam 19 and the adjustment of set screw 28, and the chuck will begin to come back up. Shortly thereafter, due to the configuration of cam 20, cam follower 22 and jaw $J_1$ will follow the cam back to the left, tension spring 39 pulling them. As jaw $J_1$ moves to the left, compression spring 36 holds jaw $J_2$ against stop 27 and causes the jaws to separate, until pin 37 engages the left end of slot 38, as in Fig. 3, when the jaws will begin to move to the left in unison, thus pulling the nut along and into discharge position under knockout pin K, as in Fig. 4.

Knockout pin K is mounted in a holder 45 and is surrounded by a coil spring 46 so that resilient pressure will be exerted on the nut, causing the nut to drop freely through a hole 47 in block 14 into an outlet chute 47, as in Figs. 5 and 6. The lower end of the knockout pin is slightly below the top of the nut as it comes beneath the pin, and, as in Fig. 5, the coil spring 46 is compressed by the nut as it is carried along by jaw $J_2$, the pressure of the spring snapping the nut down into the chute.

Holder 45 is mounted on a bracket 50, attached to block 14 atop a plate 51, which forms a cover for sliding bar 23. As in Figs. 1, 2, and 5, plates 52 and 53 similarly provide covers for sliding jaws $J_1$ and $J_2$.

Chuck 11 and cam shaft 18 are rotated at suitable speeds by conventional motor and gear reduction drives, or in any other suitable manner. The speed of the chuck and cam shaft 18, and configuration of cams 19 and 20, are so chosen that upward and downward movements of the chuck are correlated with the reciprocal movements of the jaws, and with the optimum drilling speed, so that the drill begins to come down as the jaws begin to close on a nut and the jaws begin to move back as the drill begins to move up. Of course, there is normally provided a slight time lag between the start of the upward movement of the drill and the leftward movement of the jaws, since the drill must disengage itself from the hole it has countersunk. However, the distance that the drill must travel and the distance that the jaws must travel is relatively small, and the jaws and adjacent portions of the apparatus are preferably so constructed that they do not interfere with the free movement of the drill. In addition, cam 19 is preferably so constructed that drill 10 is permitted to come back up much faster than it went down.

In the modification illustrated in Figs. 7 to 9, inclusive, the nuts are fed down a chute F as before, but are received in a passage flanked by guideways 60 mounted in a block 59. The passage is substantially perpendicular to the movement of the nuts in chute F, and a plunger P having a tongue 61 extending into the passage between guideways 60, pushes each nut along the passage in succession. The end of tongue 61 is forked as at 62 so as more readily to catch the hex. If the nut is not straightened by fork 62, it will be straightened by a pair of blocks 63, the ends of which are provided with vertical grooves 64 which will catch the corner of the hex and cause the nut to twist around in the passage until two sides of the hex are parallel with two sides of the passage. Blocks 63 are pressed against the nuts by springs 65, extending into suitable drillings in the blocks, as in Fig. 8.

The passage formed by guideways 60 is narrower at the discharge end than at the inlet end, in order to permit easy entrance but to prevent possibility of misalignment for the countersinking operation. Cover plates 66 of Fig. 8, which are attached to the guideways by screws in tapped holes 67 and are accurately positioned by template holes fitting over pins 68 of Fig. 7, prevent the nuts from jumping out of the passageway, and are spaced slightly apart. The distance between plates 66 is just sufficient so that the drill or other tool may come down between the plates.

To hold each nut securely in longitudinal position during the drilling or other operation, four detent pins 70 are provided. Each detent pin, as in Fig. 9, is provided with a front hemispherical end 71 and a rear cylindrical end 72, with a cylindrical shoulder between. The hemispherical ends of the pins stick out through suitable holes 74 in the guideways, while the shoulders abut against the bottoms of larger drillings 75. A spring 76, surrounding the cylindrical rear end of each detent pin, presses the front hemispherical end of the pin against each nut as it comes by, thereby holding the nuts in position, as in Fig. 9. As a nut is pushed into operating position, in passing it depresses the two rear detent pins, and then slips past into a position between the front and rear detent pins, the rear detent pins springing back into place. Each nut is thus held securely in correct position beneath the tool. After the countersinking operation or the like has been completed, the line of nuts in the passage is pushed along by the plunger, and the last nut— the nut which has just been countersunk—is moved on past the front pair of detent pins, depressing them. When the rear inclined surfaces of the hex reach the curved surfaces of the pins, the nut is ejected from the passage with a snapping action. With suitable spring pressure behind the detent pins, the nuts can be given sufficient impetus to travel several feet upon being ejected, and it is desirable to provide some sort of collecting trough adjacent the point of ejection, the trough leading to a chute or suitable receptacle for catching the nuts. An air supply for blowing away chips, preferably in a direction transverse to the passage between guideways 60, may be added, if desired.

Reciprocation of plunger P of Fig. 7 is correlated with the reciprocal motion of bar 23 in any suitable manner, as by cams, as in the previous modification. Or, plunger P and bar 23 may be actuated by electrically controlled and timed air operated pistons, so that the drill will begin to come down while the next nut is still being pushed into position, and the next nut will begin to be pushed into position while the drill is still going up from the previous nut. As apparatus constructed in accordance with this invention has been proven capable of countersinking as many as 250 nuts per minute, proper timing is important for efficient and effective operation.

Although this invention has been described with reference to apparatus for countersinking nuts or the like, it will be understood that the principles thereof are applicable to the construction of many different types of machines, in which a tool operation is involved. In particular, the nuts may be tapped instead of being countersunk, by substituting a tap for drill 18, and providing corresponding changes and/or adjustments to cams 19 and 20 and set screw 28. It will also be understood that certain features of this invention may be incorporated in a machine without necessarily utilizing the remaining features. It will be further understood that other changes may be made without departing from the spirit and scope of this invention, as defined in the appended claims.

What is claimed is:

1. Apparatus for performing a countersinking or the like operation on a plurality of hexagonal articles such as nuts, comprising a feed chute; a pair of jaws disposed adjacent the lower end of said chute and along a path extending at an angle to the lower end of said feed chute, said jaws having cooperating complementary forks adapted to close upon opposite sides of a hexagonal article to clamp said article; and means for moving said jaws in a direction away from the lower end of said feed chute and simultaneouly closing said jaws, and also returning said jaws in a direction toward said chute and simultaneously causing said jaws to separate, whereby said jaws are adapted to move an article from said feed chute to a predetermined position, clamp said article securely in said position while a tool operation is performed thereon, move said article away from said position and release the same, and then receive another article from said chute.

2. Apparatus as defined in claim 1, including a resiliently mounted knockout pin for pushing an article from said jaws while separated.

3. Apparatus as defined in claim 1, including a resiliently mounted knockout pin disposed on the opposite side of said chute from said predetermined position; and means for moving said jaws beyond said chute to place an article beneath said pin, and for moving said jaws back toward said chute to receive another article.

4. Apparatus as defined in claim 1, including a tool; a camshaft having cams thereon; followers for said cams; and means operatively connected with said followers for moving said tool and said jaws toward and away from said predetermined position.

5. Apparatus of the character described, comprising a feed chute for a plurality of articles; a reciprocating plunger for moving said articles, in succession, from the lower end of said feed chute along a path disposed at an angle to said chute; a guide on each side of said path; and means disposed at a predetermined position along said guide to hold each article in succession in position for a tool operation to be performed thereon, which said holding means comprises a plurality of pins having rounded ends extending through apertures in said guides, and shoulders against which resilient means press to urge said pins inwardly toward said articles, said pins being disposed so that at least one pin is in front of and one behind an article when in said tool operation position.

MICHAEL K. PROKUL.